Nov. 7, 1933.   A. E. SEYMOUR   1,934,564
PROCESS OF MANUFACTURING OLEOMARGARINE OR BUTTER SUBSTITUTE
Filed Aug. 16, 1929   2 Sheets-Sheet 2
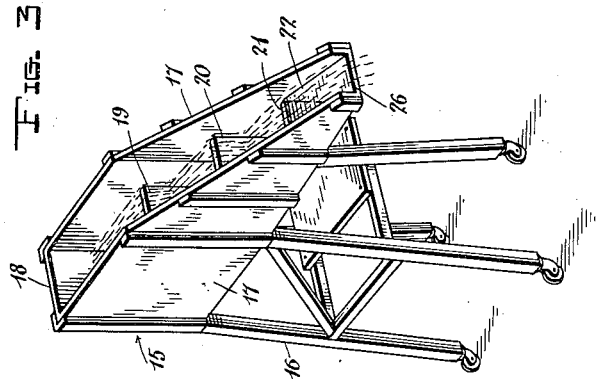
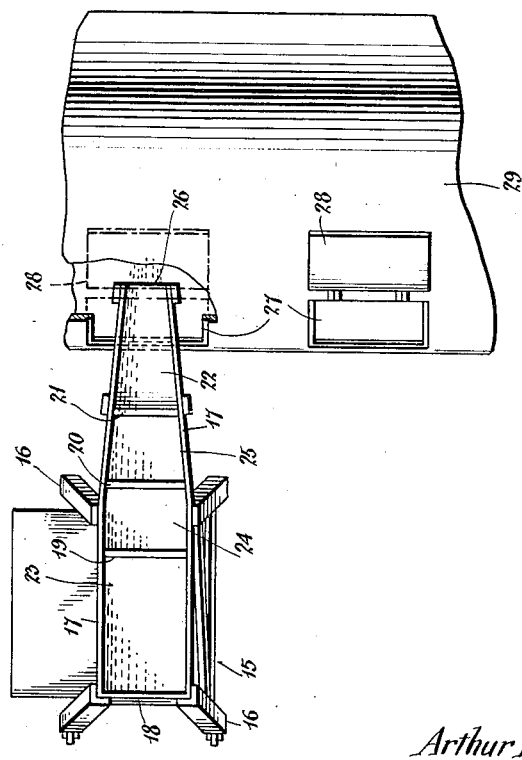
INVENTOR
Arthur E. Seymour,
BY
ATTORNEY Patented Nov. 7, 1933

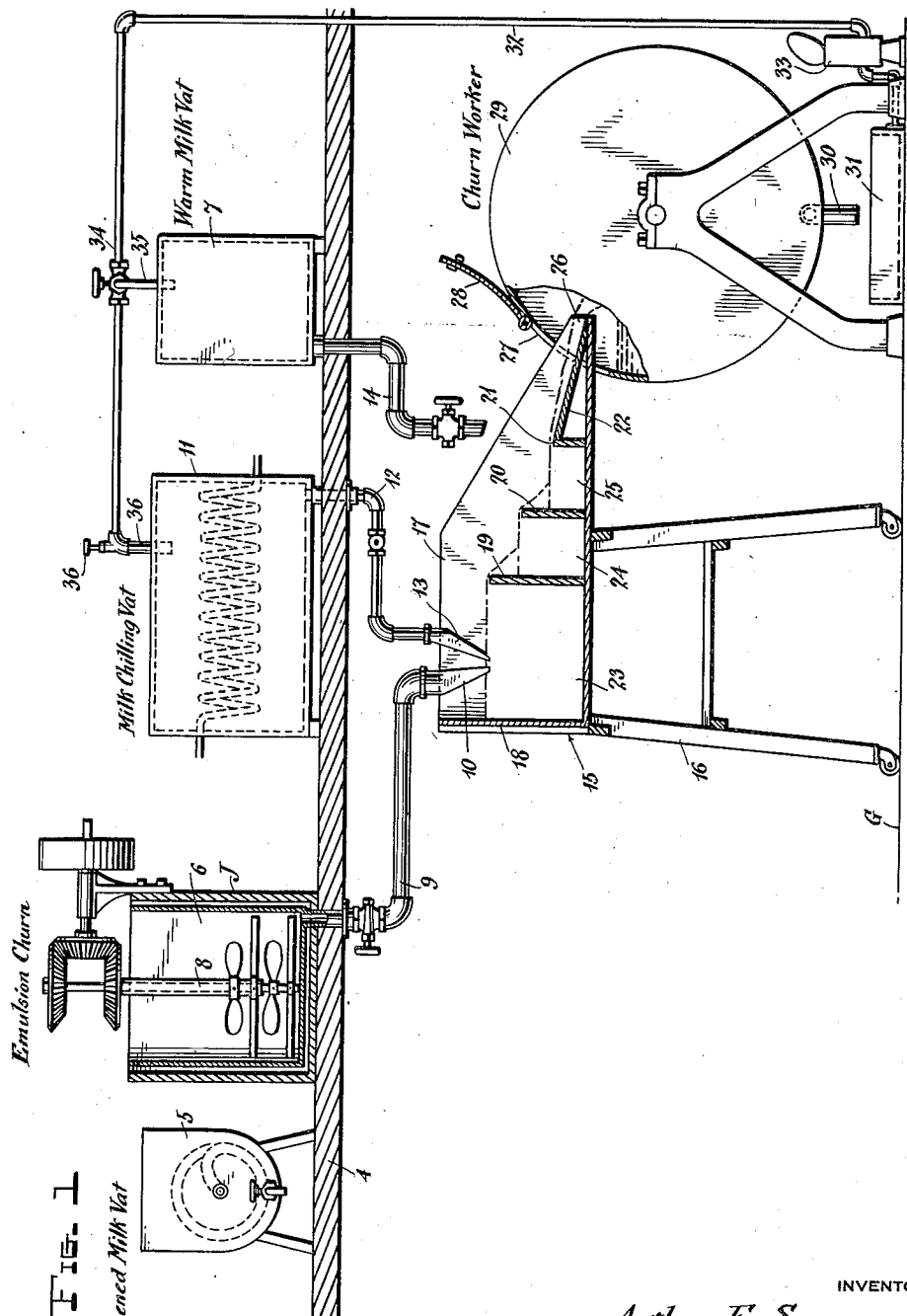

1,934,564

UNITED STATES PATENT OFFICE 1,934,564

PROCESS OF MANUFACTURING OLEOMARGARINE OR BUTTER SUBSTITUTE

Arthur E. Seymour, Alhambra, Calif.

Application August 16, 1929. Serial No. 386,348

11 Claims. (Cl. 99—13)

The present invention relates to improvements in a process for the manufacture of oleomargarine or butter substitutes, and has for its object the production of a butter substitute of a high quality which will have the qualities of creamery butter, as to taste, as to melting in the mouth and as to foaming when boiled, and will also have greatly increased keeping qualities as compared to oleomargarines made under other processes.

Another object of this invention is to avoid the addition of water and to add milk in the place of water at all stages, so that, when the edible oils solidify or crystallize, such milk may be strained therefrom and the final product may be worked and salted and have a creamery butter flavor imparted thereto.

According to the invention, to a quantity of edible oils or fats, at a temperature above the temperature at which butter will solidify, a proper amount of ripened milk, at a temperature below the solidifying point of the oil mixture, is added, this procedure resulting in an emulsion approaching very gradually a temperature below the solidifying point of the mixture, the mixture being maintained in emulsified condition from the beginning of the addition of the milk thereto. This produces a rise in temperature due to the latent heat similar to the phenomenon known as the Titre test. The mixture is successively treated with cold ripened skim milk and warm skim milk and is then worked to produce a butter substitute having the qualities of creamery butter.

In the accompanying drawings which show an apparatus suitable for carrying out the process:

Figure 1 is a diagrammatic and sectional view of a complete apparatus.

Figure 2 is a top plan view of the trough and adjacent portion of the churn worker.

Figure 3 is a perspective view of the trough per se.

In order that the process may be fully understood the various elements of the apparatus will be described with reference to the steps of the process from the very beginning, it being desirable to mount the apparatus in a two-floor structure in which the ground floor is indicated by the reference numeral G and the second floor by the reference numeral 4.

A ripened milk vat 5 is mounted upon the second floor and into this the ripened skim milk is placed for mixing with edible oils in an emulsion churn 6, provided with an agitator or dasher 8, wherein the mixture of oils and milk are properly emulsified. The emulsion temperature is preferably 3 or 4 degrees F. below the solidifying point of the oil mixture, and the milk is added in the emulsion churn 6 in several equal proportions at regular intervals, while the agitator 8 is in motion, said churn being preferably enclosed by a water jacket J, maintained at a temperature several degrees F. below the solidifying point of the oil mixture. From this procedure it results that the emulsion as it is made, gradually approaches a temperature of 3 or 4 degrees F. below the solidifying point of the oil-mixture in the churn, so that the mixture in the churn is maintained in emulsified form from the beginning to the final adding of the milk. It is best and desirable to effect this gradual lowering of the temperature of the contents of the churn to a point 3 or 4 F. below the solidifying point of the oil-mixture, and while the mixture in the churn is maintained in emulsified form, any proportion of milk may be used so long as an emulsion of "milk-in-oil" and not an emulsion of "oil-in-milk" is made. As above stated, the jacket temperature should be below the final emulsion temperature. In this instance, the emulsion temperature will remain stationary at the low point of 3 or 4 degrees F. below the solidifying point of the oil-mixture for a few minutes, and will then rise suddenly in spite of the cooling jacket, as for instance, 3 or 4 degrees F., this temperature, in practice, remaining constant for pratically 15 minutes, and during the period that the emulsion is run out of the churn. As above stated, this rise in temperature is a phenomenon similar to that of the well-known Titre test for fatty acids, except that in the present instance, it is produced in neutral fats or oils, (glycerides of fatty acids) which are in intimate emulsion with the milk. The exact degree of the rise in temperature of the emulsion is dependent upon the same condition of radiation by the jacket J, etc. as effect the Titre test.

The emulsion made as above described, is now run out of the churn through a valved pipe 9 and through a spray nozzle 10, meeting a spray of cold ripened skim milk delivered from a milk chilling vat 11 through its valved pipe 12 and its spraying nozzle 13 disposed to cooperate with the nozzle 10 and deliver therewith so that the chilled or cold ripened skim milk will be intimately mixed with the emulsion from the churn 6 into a trough 15.

This trough 15 is mounted as a portable device on a castor truck 16 and comprises two side walls 17 and a rear wall 18, graduated partitions 19, 20 and 21, which partitions divide the trough into a large receiving compartment 23 and two shallower narrow compartments 24 and 25 so that the mixture of the emulsion from the churn 6 and cold ripened skim milk from the vat 11 is sprayed into the compartment 23, and there, due to the swirling action formed by the spraying nozzles, will flow over the partitions 19, 20 and 21 in the form of a cascade, as illustrated in Fig. 1, in which the mixture will over-flow from the compartment 23 into the compartment 24 and from the compartment 24 into the compartment 25, and thence over the inclined board 22, out of the outlet 26 of the trough.

In practice, it has been found that the descent of the mixture into the deepest compartment 23 has the effect of thoroughly solidifying the margarine crystals, so that by the time the cold ripened skim milk and said crystals leave the trough, the crystals are formed and the cold ripened milk is easily strained therefrom. In this instance, the mixture is delivered into one of the openings 27, provided with a closure 28, of a cylindrical churn worker 29, and when a sufficient quantity has been delivered to the churn worker the valved pipes 9 and 12 are closed, and as the margarine crystals float on the top of the cold ripened skim milk, the cold milk is drained through a valved outlet 30 of the churn worker into a pan or receptacle 31 there-below. The cold milk in the pan 31 is returned by a pump 33 through a conduit 32 and a valved nozzle 36 into the chilling vat 11.

When all of the milk has been strained, the trough 15 is moved away from the churn 29 and warm milk is delivered from the warm milk vat 7 through the valved nozzle 14 directly into the churn worker 29, which, after the nozzle is cut off, is sealed and driven at a churning speed for a few minutes, during which time, the very fine sized crystals of margarine are actually churned, the same as in making creamery butter, and are caused to assume masses as large as a pea. The warm ripened milk, or second milk, is now drained off, the valved pipe 36 being closed and the valved pipe 34 being opened, so that, when the second or warm milk enters the receptacle 31, the pump 33 will deliver the warm milk through the conduit 32 back to the warm milk vat 7. The churn worker 29 is provided with working rolls, (not shown) which are now operated, salt having been added to the residue of crystal margarine within the churn and worked similarly to the working of creamery butter.

The milk used throughout the present process for crystallizing and tempering the churn-worker is prepared by heating it to approximately 165 degrees F., holding it at that temperature for at least one hour, and then cooling it to 68 to 70 degrees F., at which point it is innoculated with approximately 5/100 of 1% of vigorous lactic acid culture, in the form of "Starter", and ripened to an acidity of from $\frac{1}{10}$ to $\frac{1}{5}$ of 1% of lactic acid. It is then quickly chilled to 45 degrees F., or lower, and $\frac{1}{10}$ of 1% of benzoate of soda is added and thoroughly stirred into the milk. Milk made in this manner conserves all of the flavor in the emulsion when used for crystallizing, and may be used repeatedly for one whole week, being gradually replaced by the excess of the milk emulsion which is expressed during the working of the margarine in the churn worker.

Among the advantages resulting from the present process, may be mentioned the conservation in the finished margarine or butter substitute of the delicate water-soluble flavors, which are lost to a great extent when water is used for crystallizing the margarine; the texture of the margarine or butter substitute in its physical structure more nearly resembles that of creamery butter in appearance, in lustre, in its melting as in the mouth, and in the butter-like waxy feel in the mouth, as well as the foam test when boiled; thus producing an exceedingly desirable butter substitute, with none of the disadvantages of the water-treated butter substitute, and with all of the advantages of creamery butter.

By the present process, the necessity of holding the margarine in crystal form over night for tempering is avoided, as the operation is completed in the churn worker as previously set forth.

A further advantage of my process over processes wherein water is used for crystallizing the margarine is that the ripened skim milk from the milk chilling vat 11 and from the warm milk vat 7 is conserved and the milk drawn from said vats is constantly replaced by the addition of the excess milk pressed out of the crystals of margarine in the churn worker, to the amount of one half or more of the ripened milk used in making the emulsion is conserved. Therefore, important features of my process are that the emulsion crystals and crystallized milk from the emulsion churn 6 is delivered directly to the churn worker 29 and that the ripened skim milk from the vat 11, warm milk from the vat 7 and any excess milk from the emulsion churn 6 are drained off from the churn worker 29 and are returned to the vats 11 and 7, so that the cost of replacing the milk drawn from the vats 11 and 7 is avoided and the cost of extra refrigeration which would otherwise be necessary is saved.

I claim:—

1. The process herein set forth for making butter substitutes, which consists in mixing, melted edible oils with a milk at a temperature slightly below the solidifying temperature of the oils to produce an emulsion in which a slight rise in temperature due to release of the latent heat of fusion of the oil mixture is then permitted; solidifying or crystallizing the emulsion thus formed while the temperature is so raised by combining therewith cold ripened skimmed milk; draining off the liquid; adding to the crystals warm ripened milk and churning the same; drawing off the liquid; and finally salting and working the crystals in the churn.

2. The process herein set forth for making butter substitutes, which consists in mixing a milk with edible oils to produce an emulsion in which a slight rise in temperature due to release of the latent heat of fusion of the oil mixture is permitted; solidifying or crystallizing the emulsion thus formed while the temperature is so raised by combining therewith cold ripened skimmed milk; delivering the mixture to a working churn; draining off the liquid; adding to the crystals warm ripened milk and churning the same; drawing off the liquid; and finally salting and working the crystals in the churn.

3. The herein set forth process for working butter substitutes, as claimed in claim 1, in which the first milk used is ripened skim milk.

4. The herein set forth process for working butter substitutes, as claimed in claim 2, in which the first milk used is ripened skim milk.

5. The herein described process of making butter substitutes, which consists in producing an emulsion of milk and edible oil or oils at a temperature slightly below the solidifying temperature of the oils, then allowing a slight rise of temperature due to the release of latent heat of the oil mixture, and while the temperature is so raised expelling said emulsion and simultaneously expelling cold milk and mixing said milk with the emulsion, cascading said mixture to cause the oil or oils to crystallize and float in the milk, draining off the milk, adding to the crystallized oil or oils warm milk and churning the same to cause the finer crystals to coagulate, drawing off the milk, and working the crystals with salt.

6. The process as set forth in claim 5, in which the first and second milk used is ripened skim milk.

7. The process of making butter substitutes which comprises melting edible oils, intermittently adding to said melted oil small increments of milk having a temperature slightly lower than the solidifying temperature of said oil to emulsify said oil, maintaining the formed emulsion at a temperature below the solidifying temperature of said oil, for a time, then permitting a slight rise in the temperature of the emulsion due to the release of latent heat of the oil mixture, and while the temperature is so raised crystallizing the emulsion by spraying the same with cold milk.

8. The process as in claim 7 in which the milk used is ripened skim milk.

9. The process as in claim 7 in which the milk used is ripened skim milk and in which the crystallized emulsion is further treated and agitated with warm milk.

10. In a process for making butter substitutes the steps comprising intermittently adding to melted edible oils milk having a temperature slightly lower than the solidifying temperature of said oils to emulsify the oils, maintaining the emulsion for a time at a temperature slightly below the solidifying point of the oils, with continued agitation of the emulsion, then permitting a slight rise in temperature of the emulsion due to the release of latent heat of the oil mixture, and while the temperature is so raised bringing the emulsion into contact with a spray of cold milk, thereby solidifying and crystallizing the emulsion.

11. A process set forth in claim 10 in which the milk used is ripened skim milk.

ARTHUR E. SEYMOUR.